Aug. 20, 1968 T. J. PEARCE 3,397,783
METHOD AND APPARATUS FOR CLEANING HORIZONTAL ROTARY
FILTERS OF THE TILTING CELL TYPE
Filed Jan. 6, 1966 2 Sheets-Sheet 2

INVENTOR.
THOMAS J. PEARCE
BY E. J. McCabe
ATTORNEY

United States Patent Office 3,397,783
Patented Aug. 20, 1968

3,397,783
METHOD AND APPARATUS FOR CLEANING HORIZONTAL ROTARY FILTERS OF THE TILTING CELL TYPE
Thomas J. Pearce, Bartow, Fla., assignor to Swift & Company, Chicago, Ill., a corporation of Illinois
Filed Jan. 6, 1966, Ser. No. 519,092
10 Claims. (Cl. 210—77)

This invention relates to a method and apparatus for the filtration of slurry mixtures and especially to improvements in continuous horizontal rotary filters of the tilting cell type. Specifically, the invention relates to improvements in the form, arrangement and additional parts which result in cleaner and more efficient operation yet achieve savings in fabrication and maintenance of filter fabrics.

Horizontal rotary filters of the tilting cell type possess advantages in that filter cake can be covered evenly with the washing liquid and can be washed uniformly over the entire filter area. Also, residual solution or filtrate present in the filter cake can be displaced efficiently by covering the cake with a minimum amount of washing water.

The filter cakes in the individual or separate filter cells of the rotary filters can be successively subjected to washing liquids as the cells are moved past selected stations during rotation of the device. Since the washing liquid utilized in each individual cell is segregated from that used in the other cells and since each cell may be conveniently washed several times, this step in the filtration process can be efficiently performed. Filters of the described type operate in a continuous cycle; each of the cells receiving a charge of liquid to be filtered at a selected point during rotation of the apparatus, then being subjected to the washing liquid at a subsequent station so as to remove the remaining filtrate from the solids and finally being inverted to remove the filter cake or solids from the cell before it is returned to an upright position to receive a new charge at the starting point. By reason of such continuous operation, filters of the described type have substantially great capacities while making possible high removal and analysis of the desired liquid from the solids.

More specifically, in the production of wet-process phosphoric acid, phosphate rock is decomposed by digestion with sulfuric acid. The resultant slurry mixture consists of calcium sulfate crystals, suspended in phosphoric acid of about 29%–32% $P_2O_5$ strength. The phosphoric acid is saturated with the calcium sulfate.

The sulfuric acid digestion of the phosphate rock also puts into solution many of the impurities found in the phosphate deposits. Impurities of larger percentages include iron, aluminum, fluorine, sodium, potassium, silica and manganese. In addition, other elements such as lead, arsenic, uranium, iodine, chlorine, etc., are also present in minute amounts in the acid.

After digestion is accomplished, the next operating step is the separation of the liquid phase acid from the solid phase calcium sulfate. It should be noted, however, that many of the impurities form saturated solutions of new compounds in the phosphoric acid. When the acid is filtered, there is a small amount of vapor flashed away as the acid passes through the resistance of the filter fabric and into the vacuum zone within the pan. This loss of vapor cools the acid slightly. The combined effect of the cooling and increased concentration causes the dissolved impurities to become supersaturated in the phosphoric acid and they begin to precipitate out. The precipitation occurs on the fibers of the filter fabric and shows up as a crystalline build-up of calcium sulfate, sodium and potassium silico fluorides and other compounds on the underside of the cloth and in the interstices between the fibers. This precipitation and build-up occurs slowly, but after 24 hours or more of operation, the filter cloth becomes almost closed off or "blinded." Because of the solids location in the cloth, their relative insolubility, and their tenacious hold on the fiber surface, these crystals cannot be removed by spraying the cloth by conventional means. Accordingly, in prior art operation, it is conventional to shut down the filtering device and manually clean the filter surface. This method is only a partial solution to the problem because the filter must be shut down during cleaning and, also, only a small fraction of the total cloth area can be cleaned away during the shut-down period.

It is, therefore, one object of this invention to provide a method and apparatus to remove and prevent the build-up of crystals on a filter cloth so that the cloth will not become "blinded".

Another object is to provide a means for continuously removing and/or prevent crystal growth on the surface of a filter cloth while the filter device is in operation.

An additional object is to reduce the amount of soluble $P_2O_5$ lost in the filter cake during the production of wet-process phosphoric acid by preventing the gradual increase in cloth blinding and subsequent carry-over of acid into the cake dump section.

Still another object is to accomplish the preceding objects with a minimum of high-pressure water, power and equipment necessary to develop the pressure required.

A further object of this invention is to prolong the life of the filter cloth by preventing localized flexing and cracking when the filter cloth hardens from the accumulation and growth of crystals between the cloth fibers.

Additional objects of the invention, if not specifically set forth herein, will be readily apparent to those skilled in the art from the detailed description of the invention which follows.

Generally, the invention is concerned with an improved method for cleaning filters and preventing the build-up of crystalline impurities between the woven fibers. Also, a part of the invention is a novel apparatus for effecting such cleaning of the filter cloth. Part of the invention relates to a mechanical device that drives a single high-pressure nozzle, at a uniform rate, slowly across the filter cloth surface while the filter cell is inverted and the filter device is operating. The nozzle movement across the cloth is very slow, taking about four hours to make the traverse. Since the filter is rotating horizontally while the nozzle is traversing along a radial line, the result is a uniform cleaning of all the cloth surface during a traverse cycle. By means of this invention, it is possible to automatically keep the filter cloth surface open, thus allowing for maximum continuous capacity. This is done with a minimum of water and power requirements. The apparatus employed for effecting the cleaning of the filter cloth is economical, has a minimum of moving parts subject to wear and breakdown, and requires little operator attention.

More particularly, in a process where phosphoric acid is separated from the calcium sulfate filter cake by means of filtering, inverting the filter pan, and dumping the calcium sulfate solids thus exposing the fabric surface, the invention comprises the steps of contacting the filter surface with a high-pressure water jet spray operating in an oscillating manner, i.e., in an arc of motion to uniformly traverse a path across the inverted filter cloth surface. As the filter pan turns overhead, the effect of the spray on the total filter surface is a close spiral of cleaned area moving radially outward to the end of the pan and then moving back to the inside edge.

Specifically, the method of this invention comprises discharging filter cake from a horizontal inverted moving filter cell and cleaning the filter fabric as well as preventing crystalline growth thereon. The method includes the steps of washing the filter fabric with low-pressure liquid and contacting the fabric with a high-pressure liquid in an oscillating manner whereby the spray from the high-pressure nozzle uniformly traverses a path across the rotating filter cell.

Advantages and unique features of the invention will be apparent to those skilled in the art from the reading of the detailed description in conjunction with the accompanying drawings in which.

Figure 1:
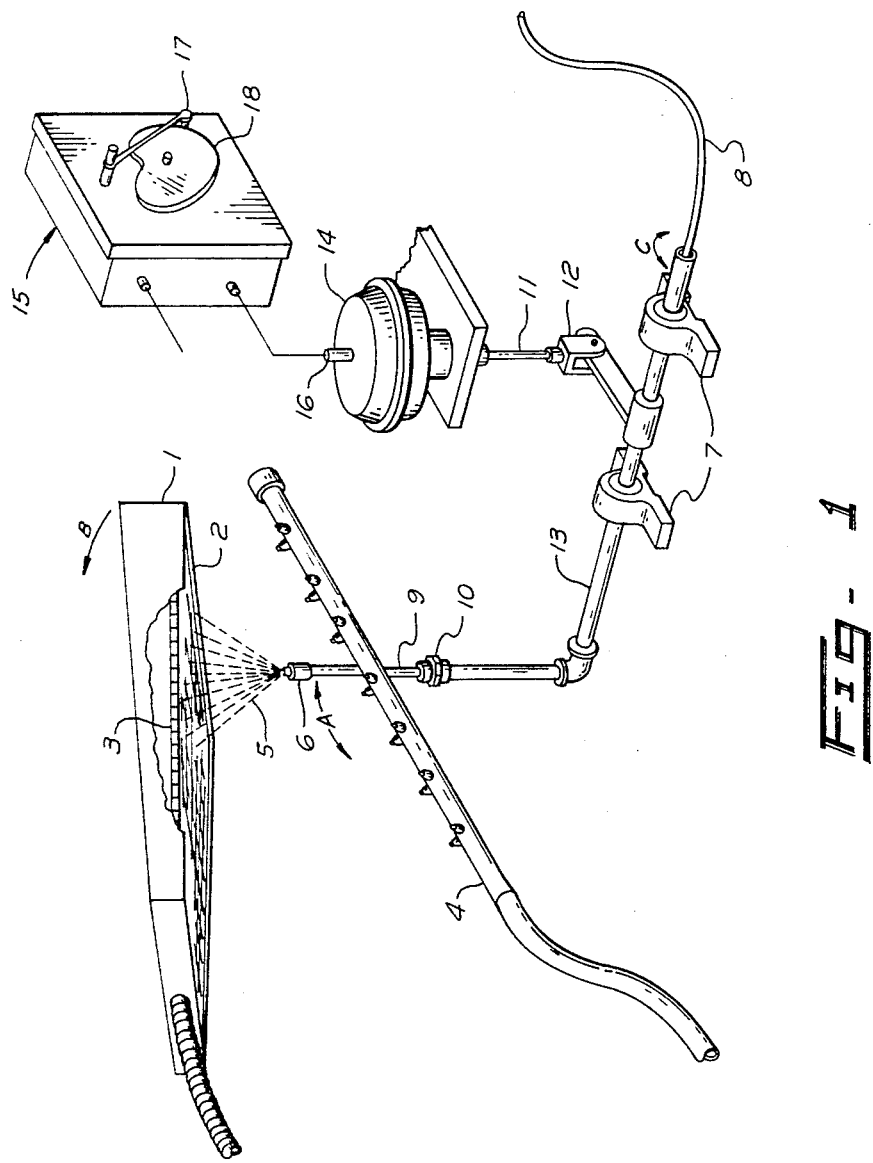
FIGURE 1 is a perspective view of an embodiment of the invention with the filter pan inverted.

A rotary filter of a particularly desirable type which the invention relates to is the pivotal cell filter in which each cell is mounted for pivotal inversion about an axis which extends generally radially from the center of the array. This arrangement permits advantageous location of the numerous stations past which the cells rotate, and inversion and return of the cells is easily effected as with a controlling cam track. Such rotary filter apparatus, comprising a multiplicity of filter cells horizontally disposed in circular array, are well known in the art and are adequately described in various patents. For example, U.S. Patent No. 3,139,404, issued to Stock, adequately discloses large, horizontal, rotary filter structures. No useful purpose would be accomplished by describing in detail the entire filter device and, accordingly, it will suffice to merely incorporate herein by reference the entire disclosure of the Stock Patent No. 3,139,404.

Referring now to the drawings, a multiplicity of filter cells or pans 1 (only one shown for simplicity) are closely arrayed in a circular series, each cell or pan extending between circular frame elements. (See the Stock patent for details.) Each cell 1 is preferably of a generally isosceles trapezoidal design, having side walls and end walls, all flared outwardly to permit filter cake drop-out. Each cell has a sheet form filter media or fabric surface 2 disposed over a support grid 3. The filter media is usually a fabric woven from monofilament polypropylene, polyethylene, or Saran. The openings in the media are quite fine, ranging upward from 90 microns size particles retained on a first pass basis. A flexible hose attached to the cell, removes the liquids, vapors and gases that pass through the fabric and into the pan. A multiple spray header 4 having a plurality of low-pressure sparges is mounted below the filter cell, spaced slightly below the lowest plane of the cells when overturned, extending between two circular elements and connected to a wash liquid source (not shown). Water discharges from the spray header 4 generally at a pressure of about 40–50 p.s.i.g.

Figure 2:
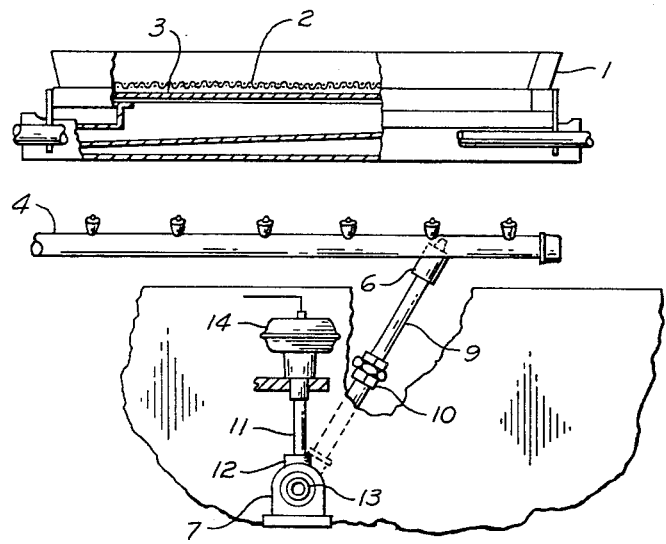
FIGURE 2 is a side view of a portion of the apparatus of FIGURE 1 with the filter pan in an upright position.
Figure 3:
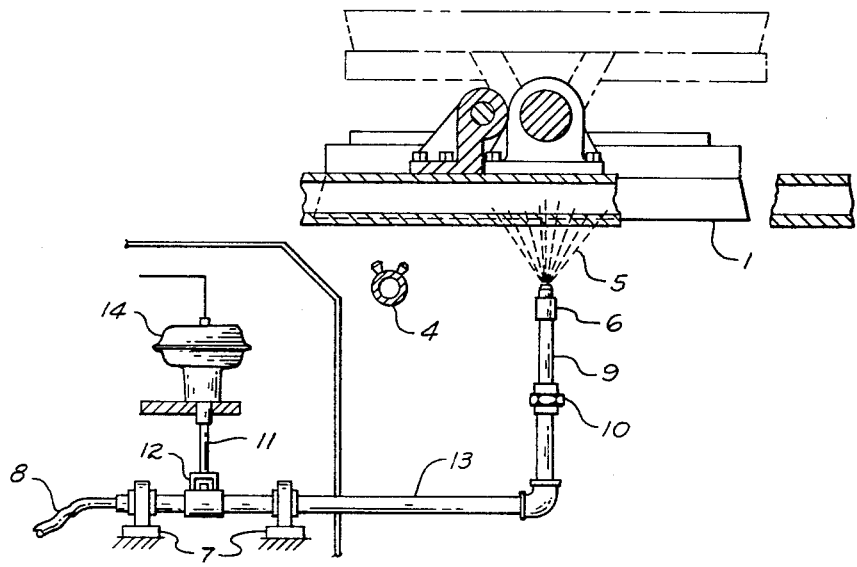
FIGURE 3 is an end view of the apparatus of FIGURE 1 with the filter pan in an inverted position.

As the inverted cell passes overhead, the fabric surface is hit by a high pressure jet spray 5 issuing from jet nozzle 6. The water is obtained from hydraulic pump (not shown) through hydraulic hose 8 and support pipe 9 connected through union 10. In the preferred manner, the jet nozzle 6 moves very slowly, taking about 8 hours for a complete cycle. In other words, starting at the left point of arc A (as best seen in FIGURE 2) it would take 4 hours for the nozzle to move to the maximum point at the right side of the arc and 4 hours to return to the starting point. Only about 60° of angular rotation (30° from vertical) are required to traverse the cloth in the instant apparatus. As the inverted filter pan 1 turns overhead the effect of the spray on the total filter surface 2 is a cleaned area moving radially outward to the end of the pan in 4 hours and then moving back to the inside edge in 4 more hours.

Movement of the nozzle 6 and support pipe 9 is controlled by linear motion of pneumatic positioners stem 11 connected to moving crank 12 which communicates with and rotates drive shaft 13 which is rotatably mounted in bearings 7. Water discharges from the nozzle at high pressure, in the order of about 300 to 1,000 p.s.i.g., and since the nozzle is in angular oscillation and about 3 feet from the cloth, the fabric is cleaned of crystal growth without destroying the fabric. If the spray was stationary the high pressure would cut a path through, and destroy the fabric in the middle of each cloth. It should be noted that the multiple spray header 4 is standard in the art, however, its main use is to knock off the loosely adhering cake from the cloth and pan. It does not keep the filter cloth free from crystalline growth.

Pneumatic positioner 14 is operated by controlled air pressure from time cam transmitter 15 by means of connecting tubing 16. Air pressure from transmitter 15 is governed by the position of follower 17 against clock driven uniform rise and fall cam 18. Movement of the spray nozzle could be controlled by other means such as a horizontal shaft and piston. However, this would require, in commercial operation, a shaft movement of about 7 feet or else the addition of a plurality of nozzles. The important point is, however, that a complete traverse of the fabric with the spray must be accomplished.

The high pressure pump (not shown) must be operated with clear, fresh water. The use of fresh water promotes the loosening and dissolving of the attached crystals. However, its use must be minimized since the water goes into the contaminated water system. The contaminated water is usually confined in a closed, recirculating, reservoir and ditch system. Any excess water in this system must be treated with lime and settled before it can be discharged into the plant effluent water stream. Because of this, contaminated water is usually used in the multiple spray pipe 4. The contaminated water can be put through a centrifugal pump which will build up enough pressure to dislodge the loose cake but it cannot clean the cloth of the precipitated crystalline solids.

In operation, the angular oscillating mechanism drives a single, high pressure nozzle at a uniform rate, across the filter cloth surface while the pan is inverted and the filter is operating. Since the filter is rotating horizontally while the nozzle is traversing along a radial line the result is a uniform cleaning of all the cloth surface during a traverse cycle. Accordingly, one of the unique features of the instant apparatus is the automatic, uniform and continuous cleaning of the filter fabric media while the filter is operating. This allows the filter to operate continuously resulting in greater production, and reduces soluble $P_2O_5$ losses with increased overall recovery and profits.

Obviously many modifications and variations of the invention as hereinbefore set forth may be made without departing from the spirit and scope thereof and accordingly, only those limitations should be imposed as are indicated in the appended claims.

I claim:

1. The method of discharging filter cake from a horizontally rotating filter cell in which the filter cell surface is inverted for cleaning, and cleaning the filter fabric as well as preventing crystalline growth thereon which involves the steps of washing the filter fabric with a low pressure liquid and contacting the fabric with a high pressure liquid in an oscillating manner whereby the spray from the high pressure nozzle uniformly traverses a path across the inverted surface of the horizontally moving filter cell.

2. The method of claim 1 wherein the high pressure liquid is fresh, clear water.

3. The method of claim 1 wherein the high pressure liquid discharges at a pressure of more than about 300 p.s.i.g.

4. The method of claim 1 wherein the high pressure liquid uniformly traverses a path across the rotating filter cell in about 4 hours.

5. The method of claim 1 wherein the spray from the high pressure nozzle on the total filter fabric produces a spiral path of cleaned surface moving radially outward to the end of the cell.

6. The method of claim 5 wherein the spiral moving radially outward to the end of the cell continues for about 4 hours and then moves back to the inside edge during 4 more hours.

7. The automatic filter washing apparatus for use in combination with a continuously rotating horizontal rotary filter of the tilting cell type, said apparatus comprising: spray means located below the zone of cell inversion of said filter for directing a high pressure liquid at the cell fabric, conduit means connected to said spray means for supplying said high pressure liquid thereto, positioner means operatively connected to said spray means for moving said spray means radially relative to the inverted cell so that the spray traverses from one end of said cell to the other, control means operatively connected to said positioner means for governing the movement of said positioner means, and a high pressure pump for supplying said liquid to said conduit means.

8. The apparatus of claim 7 wherein the spray means is rigidly connected to a shaft rotatably mounted, said shaft being rigidly connected to drive means for rotating and counter-rotating said shaft whereby said spray means is moved in an arc-like motion and spray from said nozzle reciprocably traverses the cell from one end to the other.

9. The apparatus of claim 7 wherein the control means comprises a time cam transmitter.

10. The apparatus of claim 9 wherein the cam is a uniform rise and fall cam.

References Cited
UNITED STATES PATENTS

| | | | |
|---|---|---|---|
| 985,611 | 2/1911 | Lynch | 210—328 X |
| 2,853,193 | 9/1958 | Crumb | 210—328 |
| 3,139,404 | 6/1964 | Stock | 210—328 X |

SAMIH N. ZAHARNA, *Primary Examiner.*